US008279782B2

(12) United States Patent
Abdel-Ghaffar et al.

(10) Patent No.: US 8,279,782 B2
(45) Date of Patent: Oct. 2, 2012

(54) SYSTEMS AND METHODS FOR THE ASSIGNMENT OF A PLURALITY OF PROCESSORS TO A PLURALITY OF DATA SERVERS

(75) Inventors: Hisham S. Abdel-Ghaffar, Eatontown, NJ (US); Walid Ahmed, Eatontown, NJ (US); Sanjiv Nanda, Lunenburg, MA (US); Ashwin Sampath, Somerset, NJ (US)

(73) Assignee: Alcatel Lucent, Paris (FR)

( * ) Notice: Subject to any disclaimer, the term of this patent is extended or adjusted under 35 U.S.C. 154(b) by 1786 days.

(21) Appl. No.: 10/197,831

(22) Filed: Jul. 19, 2002

(65) Prior Publication Data
US 2004/0013100 A1 Jan. 22, 2004

(51) Int. Cl.
*H04B 7/005* (2006.01)
(52) U.S. Cl. ........ 370/278; 370/328; 370/338; 455/561; 709/203
(58) Field of Classification Search ............... 370/278, 370/328, 331, 338; 455/436, 437, 442, 561; 709/203
See application file for complete search history.

(56) References Cited

U.S. PATENT DOCUMENTS

| 6,075,618 | A | * | 6/2000 | Nakai | 358/1.16 |
|---|---|---|---|---|---|
| 6,388,999 | B1 | * | 5/2002 | Gorsuch et al. | 370/335 |
| 6,493,328 | B2 | * | 12/2002 | Fong et al. | 370/329 |
| 7,003,302 | B2 | * | 2/2006 | Yoshida et al. | 455/450 |
| 7,035,644 | B1 | * | 4/2006 | Maruyama | 455/452.2 |
| 2002/0167926 | A1 | * | 11/2002 | Lee | 370/338 |
| 2003/0202497 | A1 | * | 10/2003 | Csapo | 370/338 |

* cited by examiner

*Primary Examiner* — Jung Park
(74) *Attorney, Agent, or Firm* — Capital Patent & Trademark Law Firm, PLLC

(57) ABSTRACT

The present invention provides systems and methods for the assignment of a plurality of processors to a plurality of data servers. An exemplary embodiment of the present invention provides systems and methods for addressing the problem of transmitter/receiver assignment for softer handoff in CDMA systems as well as any other system that requires variable size allocation of processors in a resource sharing environment. An exemplary embodiment of a system for processing data received from data servers according to the present invention comprises a shared medium, a plurality of processors and a smaller plurality of intermediate nodes partitioned into K sets, wherein at the $k^{th}$ set, every "k" processors are associated with one intermediate node. The shared medium couples the data servers to the intermediate nodes. Additionally, the system may include a system controller for controlling the operation of the system and the assignment of processors to the intermediate nodes and to the data servers at the beginning of each service request and thereafter upon each modification request to the service.

24 Claims, 4 Drawing Sheets

SYSTEMS AND METHODS FOR THE ASSIGNMENT OF A PLURALITY OF PROCESSORS TO A PLURALITY OF DATA SERVERS

BACKGROUND OF THE INVENTION

Wireless communication systems have grown in popularity as they have become more accessible, affordable, and reliable. In researching methods to improve the reliability and voice quality of wireless devices, such as cellular telephones, designers have sought new ways to efficiently communicate with a wireless device as it moves.

While numerous system architectures are available, the components of a wireless system typically include a mobile radio device (i.e., cell phone), a radio base station, a switch or network control device, and a backbone network to which the wireless communication system provides access.

Today, the most common mobile wireless networks are the cellular telephone networks. Cellular networks are designed using various modulation techniques for transmitting information. Most mobile wireless companies are turning to digital communication over analog communication techniques for multiple access because digital communication techniques are able to improve performance as well as support many more users in a given frequency spectrum. Common multiple access techniques that are based on digital modulation include frequency division multiple access (FDMA), time division multiple access (TDMA), and code division multiple access (CDMA), and global system for mobile communication (GSM). The mobile wireless industry had undergone multiple generations from the first generation (analog/digital cellular telephony) to the second generation (digital personal communication services, or PCS) to the third generation (digital multimedia services, soon to be launched). The third generation partnership project (3GPP) is one of the third generation wireless standards based on CDMA technology and will deployed worldwide (see, http://www.3gpp.org and ftp://ftp.3gpp.org).

Typical wireless cellular systems utilize fixed base transceivers (i.e., base station) to support certain geographic areas. The geographic areas are divided into small areas, referred to as cell sites. Coverage provided by a certain base station is measured as a radius from the base station antenna. Each cell site may be supported by a single base station or wherein the cell site may be subdivided into smaller sub-cells through cell splitting and/or sectorization by steering antenna patterns.

In a typical operating environment, a wireless device user moves from cell to cell while operating the wireless device. Such movement creates challenges for the wireless network designer. The wireless network must be able to efficiently pass an active transmission from one base station to another as the user moves between cells. The process is referred to as a handoff.

Typically, a handoff is performed when the base station currently communicating with the mobile device detects that the received signal strength from the mobile device has dropped below a predetermined level. This low signal strength indicates that the user may be approaching a cell boundary. When this occurs, the cellular system determines whether another base station or another sector within the same base station is receiving a stronger signal from the mobile device.

There are two basic types of handoffs that a wireless system may employ. The first type of handoff is the hard handoff. Hard handoffs are characterized by the break-before-make strategy. Hard handoffs discontinue communication with the current base station prior to connecting to the new base station. The second basic type of handoff is the soft handoff. Soft handoffs are characterized by a make-before-break strategy. Accordingly, the mobile device communicates on multiple radio links with one or more base stations simultaneously during the call while performing soft handoff. Soft handoff is a unique handoff method that characterizes CDMA technology.

Within the category of soft handoffs, are softer handoffs. Softer handoffs are used when two or more out of all the radio links in a call are established on sectors of the same cell site. The introduction of second and third generation CDMA systems has imposed a large demand on the number of radio links per call for performance purposes (e.g., up to 6 links for 3GPP). Furthermore, the capacity requirements in metropolitan areas have imposed a large demand on sectorization (up to 6 sectors per cell site). Therefore, it is likely in many scenarios that many (e.g., 4 out of 6) sectors can be involved in softer handoffs.

To perform soft or softer handoffs, a mobile device must be able to communicate on multiple radio links with multiple base stations simultaneously during the call. This is generally accomplished by utilizing multiple transceivers within a single wireless user device. When designing transceiver boards in the base station, it is necessary to assign signal buffers which store the data to be transmitted (or received) to multiple processors, e.g., transmitters (or receivers). For example, in a CDMA system, a "softer" handoff requirement implies that multiple copies of the call signal may be transmitted over multiple sectors of the same base station. Hence, data is to be downloaded from a buffer (e.g., memory device) onto several transmitter devices—in the base station—such that multiple copies of the data may be transmitted. Thus, a base station assigns a single data server (e.g., buffer) to the call, with multiple processors (transmitters/receivers) to support all links on all sectors for such call. In the presence of many calls, that have been setup with the same base station, it is imperative to design an efficient scheme/architecture that would organize the communication between signal buffers (e.g., data servers) and the available transmitter/receiver devices (e.g., processors). Current solutions to the problem include fixed assignment schemes and pooled assignment schemes.

Therefore, it is evident that there is a need in the art for systems and methods for providing a processor assignment scheme that efficiently assigns processors to data servers. Additionally, it is evident that there is a need in the art for systems and methods for providing a processor assignment scheme with a manageably sized shared medium.

SUMMARY OF THE INVENTION

The present invention overcomes the limitations of the existing technology by providing systems and methods for the assignment of a plurality of processors to a plurality of data servers. An exemplary embodiment of the present invention comprises a first set of processors, a second set of processors, a first set of intermediate nodes associated with the first set of processors, a second set of intermediate nodes associated with the second set of processors, and a shared medium. The shared medium couples the data servers to the intermediate nodes. The system may also include a system controller for assigning processors to intermediate nodes and to data servers. The system controller uses various subroutines and algorithms to control these assignments at the beginning of each service request and thereafter upon each modification request to the service.

In an exemplary embodiment of the present invention, a plurality of processors and a smaller plurality of intermediate nodes partitioned into K sets are used, where in the $k^{th}$ set, every "k" processors are associated with one intermediate node.

Other features and advantages of the present invention will become apparent upon reading the following detailed description of the embodiments of the invention, when taken in conjunction with the accompanying drawings and appended claims.

DETAILED DESCRIPTION

Figure 1:
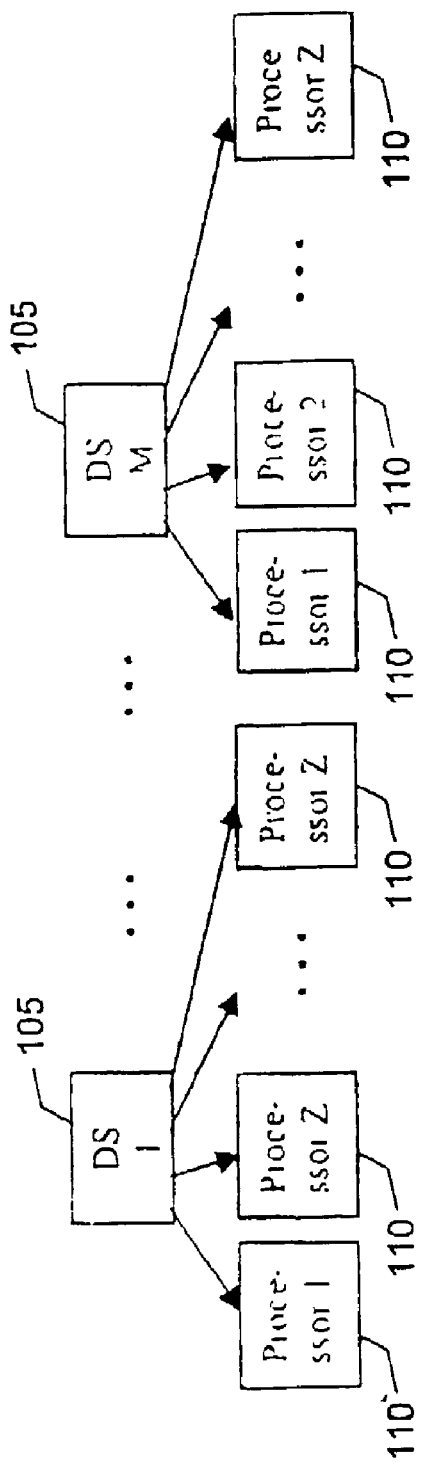
FIG. 1 is a block diagram illustrating a full redundancy assignment scheme.

Referring now to the drawings, in which like numerals refer to like techniques throughout the several views, exemplary embodiments of the present invention are described.

As illustrated in the background of the invention, the demand for high capacity in modern wireless networks has created the need for high sectorization in cell sites, while the demand for high performance has created the need for establishing multi radio links (requiring multiple processors) for one call served on the same base station; the latter is a scenario known as softer handoff in CDMA. This situation has created a complex resource-sharing problem where the number of required processors is not necessarily the same for each call on the base station. The current invention has been motivated by demand of the 3GPP technology, wherein up to 6 radio links can be established for a single call and up to 6 radio links can be established on sectors within the same cell site. Without loss of generality, the current invention applies to any system that requires variable size allocation of processors in a resource-sharing environment. In an exemplary embodiment of the present invention, the systems and methods described herein are applied to the allocation of processors in a base station within a wireless network.

In order to understand the different approaches of assigning processing resources to data servers, some terminology and basic framework should first be established. The general system is assumed to be a stationary system consisting of M data servers. Without loss of generality, it may be assumed that the system assigns data servers to incoming service requests on a First-Come, First-Serve (FCFS) basis and the data servers are arranged in a cyclic priority fashion, i.e., Start by assigning a service request to data server number 1.

If the least order data server $m_0$ is busy while data server $\{(m_0+1) \mod M\}$ is empty, then assign a service request to the data server $\{(m_0+1) \mod M\}$, where "mod" denotes the modulus operation.

For example, and without limitation, let M=8; if servers 2, 3, 5, 8 are busy, assign the incoming service request to server 4; if servers 6, 7, 8 are busy, assign the incoming request to server 1.

The system does not require a front-end storage queue for the assignment of processors to servers. Hence, this stationary system can be closely represented as a general M-server queuing system with blocking, which includes, but is not limited to, the M/M/M/M queue with Poisson arrivals, exponential service and Erlang-B blocking.

Next, in an exemplary general system, each service request requires j processors, where j=1, 2, . . . , J, and J is the maximum number of processors a data server can request at any point in time. Further, in a typical general system, service requests to all data servers are identical and the probability that any service request requires j processors is $q_j$. Even though it is not necessarily true in all possible scenarios and applications that $q_{j+1} < q_j$, $\forall j$, the general system assumes that this property holds without loss of generality in all communication systems of interest. The $q_j$ are estimated empirically for each particular scenario. For example, and without limitation, in a typical wireless system with softer handoff mapped to the same base station, the probabilities are in the order of $q_1$=0.8, $q_2$=0.15, $q_3$=0.05 (J=3), or $q_1$=0.75, $q_2$=0.15, $q_3$=0.07, $q_4$=0.03 (J=4).

One problem with the above model is that the number of required processors "j" can be a time-variable parameter, i.e., increased or decreased, within the lifetime of the service. To tackle this problem, two phases of the service assignment routine are defined:

1. Service Request Setup—Teardown Duration: This includes the total duration of the service, for which a communication context or service context exists in the "system" for the particular service on the designated server being assigned on FCFS basis as above. In a wireless communication example, the "system" simply defaults to the base transceiver station.

2. Sub-Service Duration: This includes the duration of the service segment during which the number of processors "j" is constant. A change of sub-service is triggered by a "Sub-Service Modification Request", which implies an increase/decrease of the number of processors "j", or just reconfiguration of the j processors (without addition/deletion), for a given communication context. In the wireless communication example, sub-service modification triggers addition, deletion or reassignment of softer handoff sector.

In this manner, one may define new system parameters at the sub-service level, for which "j" is constant, while j is reassessed whenever a sub-service modification request is received. To address the time-varying nature of service and sub-service assignments, assume that $j_i[t]$ is the required number of processors for the $i^{th}$ service context with "t" as a discrete time variable, where t=0 is the instant of the service request and t=1, 2, . . . are the instants of sub-service modification requests.

FIG. 1 is a block diagram illustrating a fixed assignment (FA) scheme. In the fixed assignment scheme (MxN-FA), each data server 105 is hardwired to a fixed number of processors 110. The MxN-FA scheme shown in FIG. 1 includes M data servers 105, with each data server connected to Z processors 110, where N=ZM and Z≦J. The number of processors 110 connected to a server 105 is chosen to be equal to the maximum number of processors 110 a data server 105 can request, i.e., designed according to the worst case scenario. One advantage of such a scheme is that it guarantees that each 105 server will always be assigned the required number of processors 110. Obviously, one disadvantage of such a scheme is its inefficiency, especially in cases where utilizing the maximum expected number of required processors 110 per data server 105 is a rare event. Also, if the maximum number of required processors 110 per server is large, it may not be possible, from an economic point of view, to implement this fixed scheme. For the FA scheme, any of the Z processors 110 hardwired to the $i^{th}$ data server 105 can be enabled or disabled (unused) individually, depending on the number of required processors $j_i[t]$. However, any unused processors by a data server 105 cannot be used by another one since all processors 110 are hardwired only to their own data servers 105.

Since $Z \leq J$, the FA scheme involves two possible scenarios:

1. Fixed Full-Redundancy Assignment (FFRA); and
2. Fixed Partial-Redundancy Assignment (FPRA).

In the FFRA scenario, Z is chosen to be equal to J, where J is the maximum number of processors 110 per service context, i.e., designed for the worst-case scenario. The advantage of this scheme is that it guarantees that each server 105 will always be assigned the required number of processors 110. The disadvantage of such a scheme is that it is generally too expensive and also inefficient. Since j=J is a rare event, especially if J is large, it may not be economically feasible to implement the FFRA scheme.

In the FPRA scenario, Z is chosen to be smaller than J, where J is the maximum number of processors 110 per service context, e.g., Z=2 for J=3 or 4. The FPRA scheme attempts to reduce the size of processor population by configuring as many processors 110 as economically allowed, but assigns them statically to data servers 105. Thus, it is inefficient in terms of introducing processor outage for each service context when j>Z. The probability of outage per service context is given by:

$$P_{out,SC} = Pr[j>Z] = q_{Z+1} + \ldots + q_J$$

The conditional probability that any of m servers 105 experience outage is the complement of the probability of all servers 105 properly equipped with processors 110, or:

$$P_{out,m|FPRA} = 1 - (1 - P_{out,SC})^m$$

The average system outage probability depends on the distribution of the number of busy servers m=1, 2, . . . , M (e.g., Erlang-B in the wireless communication example).

Figure 2:
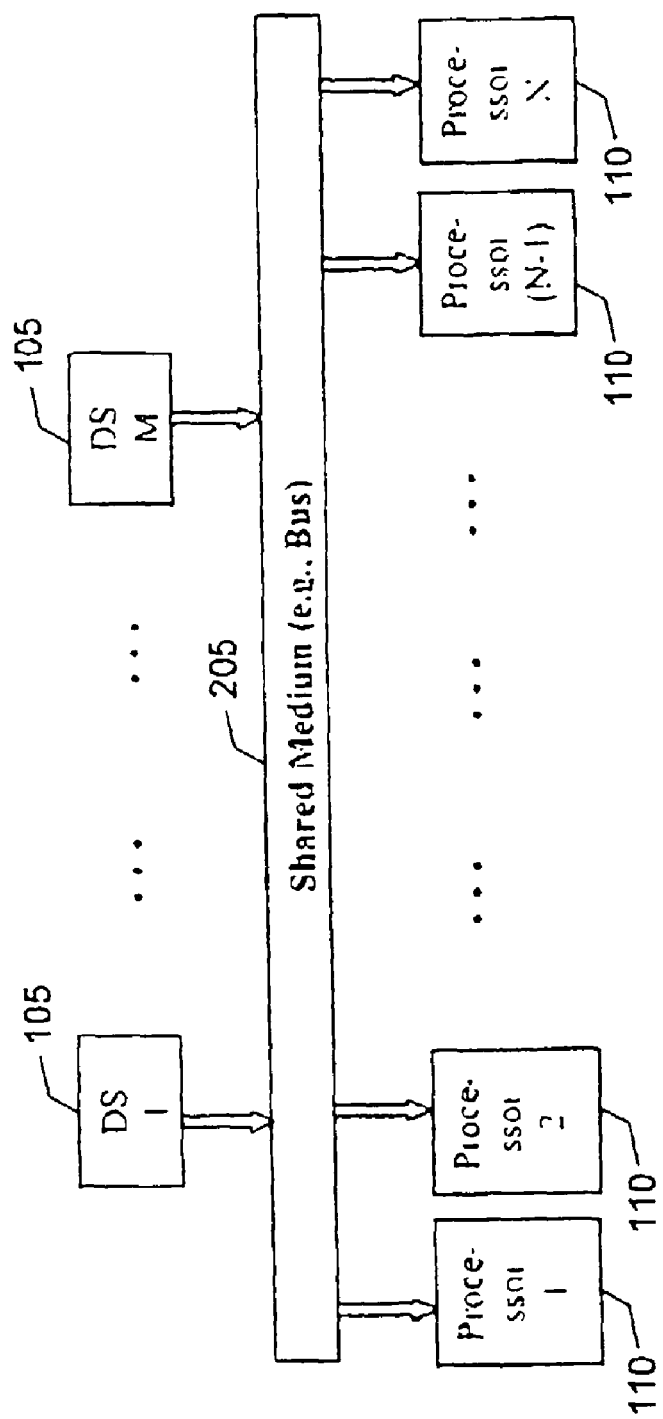
FIG. 2 is a block diagram illustrating a pooled assignment scheme.

FIG. 2 is a block diagram illustrating a pooled assignment (PA) scheme. In the pooled assignment scheme (M×N–PA), N processors 110 are pooled and allocated on-demand to each of the M data servers 105. In the PA scheme, N=Z M processors 110, where Z is smaller than J. The N processors 105 are pooled amongst the M data servers 105 and assigned on-demand. The PA scheme assigns a certain number of processors 110 from the pool to a data server 105 upon a service request or sub-service modification request. Additionally, processors 110 are enabled upon assignment. This scheme should be compared to the FPRA scheme rather than the FFRA. The advantage of this scheme is that it is the most flexible in terms of assignment. Since it uses as many processors 110 as economically allowed, and pools them amongst all M data servers 105, i.e., all N processors 110 can be accessed by any of the M data servers 105, either within the subset of "m" busy servers or the subset of (M-m) free servers. It is also very efficient in reducing the system processor outage. The PA scheme is always more efficient than the FPRA scheme (for the same number of used processors N) due to the pooling efficiency.

The main disadvantage of the PA scheme is that it requires the implementation of a fully "shared medium" 205, e.g., a bus, in order for all the N processors 110 to be accessible to all M data servers 105. Hence, for large N, any kind of shared medium 205 (bus) or medium access protocol for the PA scheme becomes too complicated, expensive to implement and difficult to manage.

From an algorithmic implementation point of view, the service routine can pre-assign the minimum processing capability (one processor) for each data server 105, i.e., M processors 110 can be pre-assigned and (Z−1) M processors 110 are completely pooled amongst the M servers 105.

Figure 3:
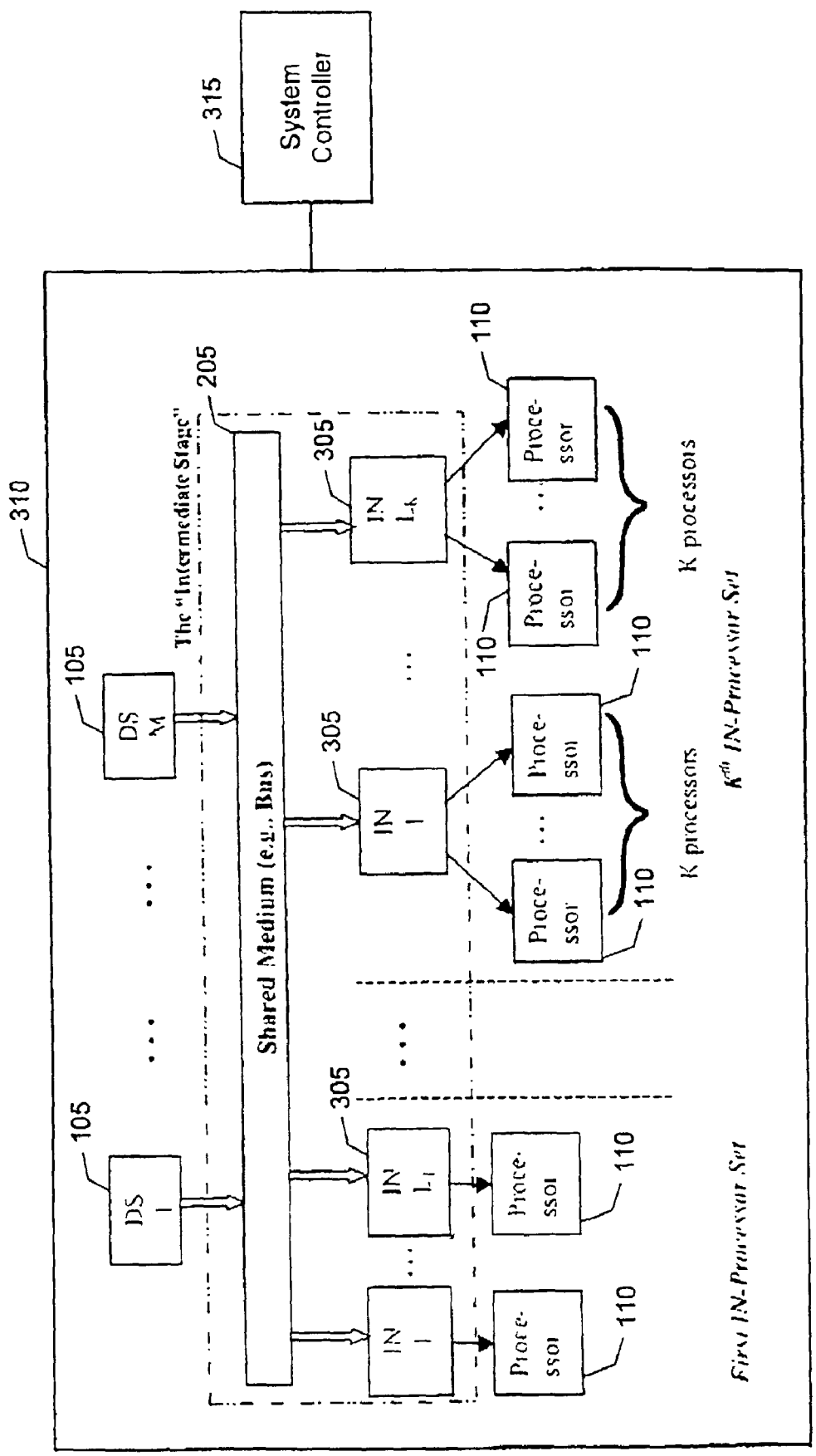
FIG. 3 is a block diagram illustrating a hybrid assignment scheme according to an exemplary embodiment of the present invention.

FIG. 3 is a block diagram illustrating a hybrid assignment (HA) scheme according to an exemplary embodiment of the present invention. The HA scheme aims to approach the processor support capabilities of the M×N–PA scheme by avoiding complex pooling mechanism at the expense of an additional amount of intermediate storage capacity. In an exemplary embodiment of an HA system 310, the data servers 105 are connected, through a shared medium 205, to an intermediate stage of Intermediate Nodes 305 (INs). The intermediate nodes 305 may or may not have memory (i.e., buffers). Each IN 305 is hardwired to a certain number of processors 110 as follows: The total number, N, of processors 110 is partitioned into K sets $\{L_1 \times 1, L_2 \times 2, \ldots, L_K \times K\}$, where $L_k$ is the number of INs 305 in the $k^{th}$ set with each IN 305 connected to k processors 110. In an exemplary embodiment of the present invention, each set of processors comprises one or more processors. Additionally, some sets may be empty sets. Hence, $$N = \sum_{k=1}^{K} k * L_k.$$

The HA system 310 is controlled by a system controller 315. The system controller 315 is responsible for implementing all of the subroutines and algorithms for the HA system 310. These subroutines and algorithms are responsible for the assignment of HA system resources to communication processes, including, but not limited to, the assignment of data servers to data calls, and the assignment of processors to data servers.

As mentioned in the description of the PA scheme, when the number of processors 110 N is large, the pooled scheme is not practical due to the need to implement a complex shared medium 205 that can connect the M data servers 105 to all N processors 110. However, with the HA scheme, the shared medium 205 does not have to be complex since it needs to connect the M data servers 105 to only $$L = \sum_{k=1}^{K} L_k$$

IN's, which can be designed such that L<<N. The savings in the shared medium 205 can far exceed the cost/complexity of the intermediate node 305 stage itself. For example, for M=20 with N=200, partitioned in 4 IN-processor sets as {20×1, 20×2, 20×3, 20×4}, where $L_1=L_2=L_3=L_4=20$, L=80<<N comparison with the FPRA and PA schemes, N=ZM, where Z<J. The parameter K is an important design parameter that represents the HA architecture depth.

According to an exemplary embodiment of the present invention, there are several, general design rules for the HA scheme that may be adhered to:

1. The number of single processors 110 in the first set can be chosen equal to the number of data servers 105. This helps algorithmic pre-assignment for the minimum processor requirement (1 per server) as explained above. Hence, $$L_1 = M$$

However, the assignment algorithm does not necessarily have to start the service context by assigning a single processor 110 (please see the assignment algorithm in the next section).

2. A design rule of thumb in choosing K is that K be larger than or equal to Z but smaller than J, hence, $$Z \leq K < J$$

The above relationship may be shown through an exemplary base station HA scheme with M=8, N=16 (Z=2) and J=4. In such an example, an exemplary HA solution may include K=2, $L_1$=8 and $L_2$=4 (L=12), i.e., {8×1, 4×2}. This HA example requires 12 INs in a pool as opposed to 16 processors in a pool in the equivalent 8×16 PA scheme. Additionally, it offers all processor combinations, j=1, 2, 3, 4 using $1^{st}$ and $2^{nd}$ level nodes.

3. For large systems, it is possible to have some IN 305 levels with zero population, e.g., $L_1$, $L_2$, $L_4$>0, $L_3$=0. Such a possibility would depend on the statistical distribution of the number of processors 110 per service context and is considered an attribute within the scope of this invention.

4. As in the FA scheme, any of the k processors 110 in each k-Processor IN 305 can be enabled/disabled and configured/reconfigured individually at the onset of service or sub-service modification. A k-Processor IN 305 can be assigned to only one data server 105, and is available for reassignment if all k processors 110 in it are available. Accordingly, if the number of assigned processors $j'_i[t]$ is greater than the number of requested processors $j_i[t]$ (which may happen depending on the chosen IN combination), then only $j_i[t]$ processors 110 are enabled and the remaining ($j'_i[t]$-$j_i[t]$) processors 110 are disabled and may not be used by another data server 105.

5. Each k-processor IN 305 is associated a "cost metric" $w_k$, where the $w_k$ are functions of k, the number of processors per IN. The most common function is the power law, $$w_k = A \cdot k^B$$

where the linear cost function (B=1) is the most familiar cost function, but not the only possibility. Other more complex cost functions and function arguments (rather than k) may be defined in real systems without loss of applicability within the scope of the present invention.

6. Generic Quality of Service (QoS) requirements: The number of processors 110 assigned by the algorithm to the $i^{th}$ service context (data server) 105 at time "t" is described by the following notation, $$j'_i[t] = \sum_{k=1}^{K} \hat{a}_{i,k}[t] \cdot k$$

where the $\hat{a}_{i,k}$ are the numbers of k-Processor IN's, k=1, . . . , K in the IN assignment combination for the $i^{th}$ service context or any of its sub-service modifications. The evaluation of $\hat{a}_{i,k}$, $j'_i$ is provided in the "HA assignment handler" algorithm. However, in an exemplary embodiment of the present invention the algorithm is governed by the following QoS requirements:

a. At the onset of service requests:
  i. The algorithm first tries to assign $j'_i[0] \geq j_i[0]$, where $j_i[0]$ is the initially requested number of processors.
  ii. If the above requirement cannot be fulfilled, the algorithm tries to assign $j'_i[0]$ such that $j_{min} \leq j'_i[0] < j[0]$, otherwise the service is declined.
  iii. If $j_{min}$=j[0], this means the service is non-negotiable.
b. At the onset of each sub-service modification request:
  i. If a service upgrade is requested, i.e., $j_i[t+1] > j'_i[t]$ (or the next request is greater than previous assignment), the algorithm first tries to assign $j'_i[t+1] \geq j_i[t+1]$.
  ii. If the above requirement cannot be fulfilled, the algorithm shall guarantee that $j'_i[t] \leq j'_i[t+1] < j_i[t+1]$ (i.e., continuation of previous service with possible reconfiguration).
  iii. In this manner, the algorithm shall guarantee the minimum QoS requirement $j'_i[t] \geq j_{min}$ for t>0, unless the QoS requirements vary during the lifetime of the service context (which is not a very likely possibility in real systems). A sub-service modification request never causes service release.

Figure 4:
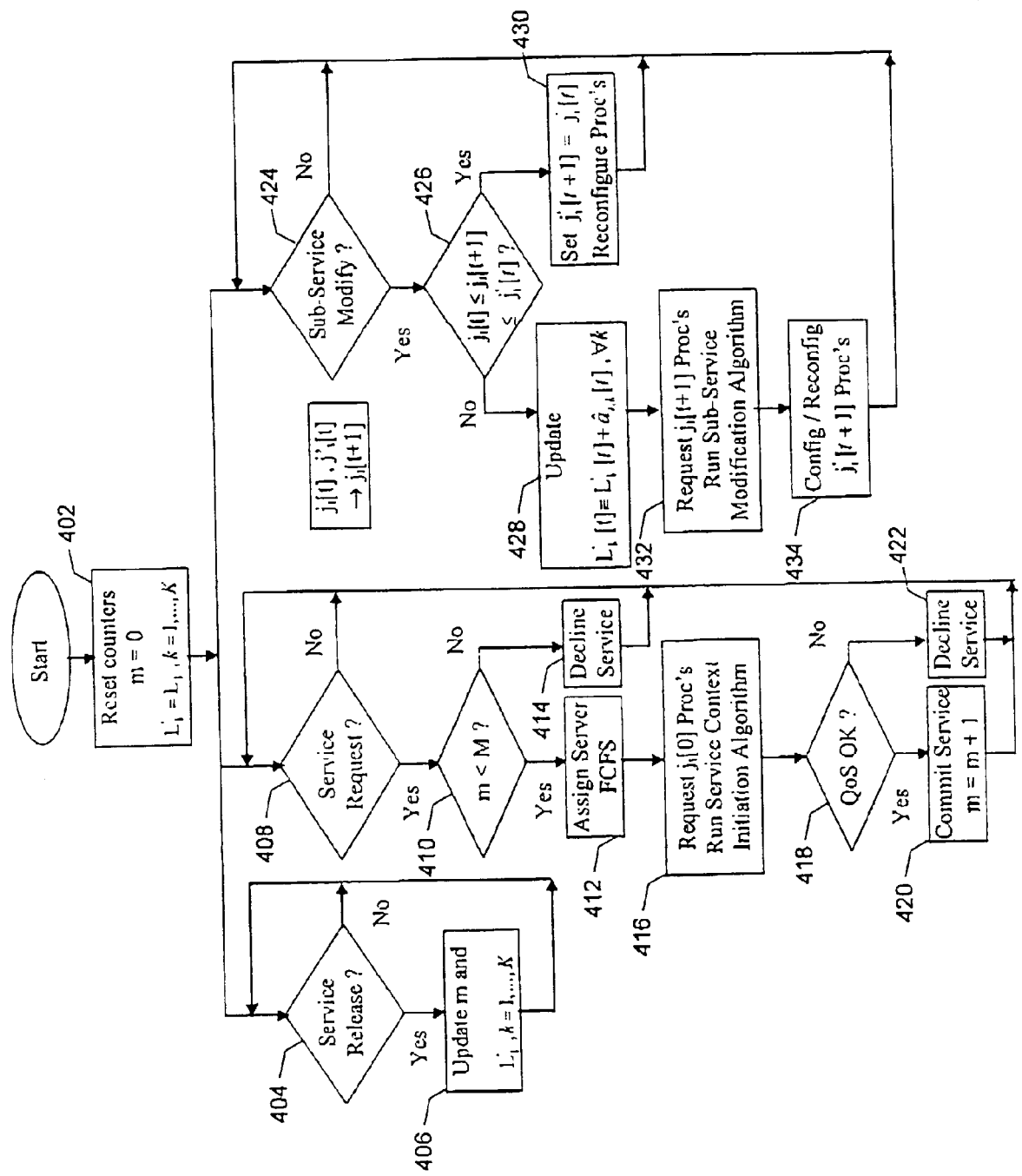
FIG. 4 is a flow diagram depicting an assignment algorithm according to an exemplary embodiment of the present invention.

FIG. 4 is a flow diagram depicting an assignment algorithm according to an exemplary embodiment of the present invention. In an exemplary embodiment of the present invention, the system controller 315 is responsible for the operation of each of the algorithms and routines described in conjunction with FIG. 4. During the service and sub-service routines, the algorithm tracks the number of available resources. The resource tracking may include, but is not limited to:

1. The number of available and busy data servers 105 (M−m), m, respectively.
2. The number of available IN's 305 $L'_k$ in each k-Processor IN 305 set of size $L_k$ for k=1, . . . , K, where $L'_k \leq L_k$ and ($L'_k$-$L_k$) IN's are assigned to busy data servers 105.

The algorithm, as shown in the flow-chart of FIG. 4, serves three main subroutines. In alternative embodiments of the present invention, none, or fewer subroutines may be included. Additionally, the subroutines may be modified to meet system requirements or design preferences. The three main subroutines are described as follows:

1. Service Request Subroutine:
  a. Upon receiving a new service request (step 408), the algorithm checks the availability of data servers (step 410) and assigns a data server based on FCFS (step 412). If no data servers are available (i.e, m=M), service is declined (step 414).
  b. The Service Context Initiation Algorithm is then entered for the new $i^{th}$ service context with an initial request for $j_i[0]$ processors and no previous processor assignments (step 416).
  c. The service is committed (step 420) if a processor assignment $j'_i[0]$ that meets the generic QoS requirement (step 418) has been granted by the service context HA handler algorithm. Otherwise, the service is declined (step 422). The decision is then sent to higher protocol layers.
2. Sub-Service Modification Request Subroutine:
  a. The subroutine is entered for a current $i^{th}$ service if a modification request is received (step 424) with a new request $j_i[t+1]$, a previous request $j_i[t]$ and a previous processor assignment $$j'_1[t] = \sum_{k=1}^{K} \hat{a}_{1,k}[t] \cdot k.$$

b. If $j_i[t] \leq j_i[t+1] \leq j'_i[t]$, (step 426) the previous redundancy can support the new upgrade request. Thus, no algorithm reassignment is needed. Set $j'_i[t+1]=j'_i[t]$ (step 430). Hence, $j_i[t+1]$ processors 110 are enabled and/or reconfigured and $\{j'_i[t]-j_i[t+1]\}$ processors 110 are disabled.

c. If $j_i[t+1]>j'_i[t]$, an upgrade is requested without previous redundancy:
  i. Update the IN counters with the previous $\hat{a}_{i,k}[t]$ without releasing the $j'_i[t]$ processors (step 428), i.e., $$L'_k[t]=L'_k[t]+\hat{a}_{i,k}[t], k=1,\ldots,K.$$

ii. The Sub-Service HA Handler Algorithm is then entered (step 432) for the new sub-service with a new request $j_i[t+1]$ and a previous assignment $j'_i[t]$.

d. If $j_i[t+1]<j_i[t]$ and $j_i[t+1]<j'_i[t]$, a downgrade is requested. Follow exactly the same steps i and ii of "c" above.

3. Service Release Subroutine:
   Upon receiving a service release request (step 404), release the $i^{th}$ service context, proceed with releasing the assigned data server and all $j'_i[t]$ processors in the most recent assignment and update the resource pools (step 406) such that:

$$m[t+1]=m[t]-1 \ \& \ L'_k[t+1]=L'_k[t]+\hat{a}_{i,k}[t], k=1,\ldots,K.$$

Each of the Subroutines described above interacts with an associated algorithm. Exemplary embodiments of each of these algorithms are described as follows:

A. The Service Context Initiation Algorithm

1. The service context initiation algorithm computes the number of processors $j'_q$ for any IN combination "q" as follows:

$$J'_q = \sum_{k=1}^{K} a_{q,k} \cdot k;$$

$$0 \leq a_{q,k} \leq L'_k$$

Where the $a_{q,k}$ aq1k are the numbers of the k-Processor IN's used for the combination "q".

2. Find the subset $Q=\{q_1, q_2, \ldots, q_C\}$, where C is the number of combinations within the subset, such that, $$J'_q \geq j_i[0]; \ q=q_1, q_2, \ldots, q_C$$

That is, the resulting number of processors per any combination "q", $q=q_1, q_2, \ldots, q_C$, is greater than or equal to the required number of processors 110 by the $i^{th}$ data server 105, $j_i[0]$, at service initiation.

a. If C=0 in step 2 (the subset is empty) and $j_i[0]>j_{min}$, find the subset $Q=\{q_1, q_2, \ldots, q_C\}$, such that, $$J'_q=j_i[0]-1; \ q=q_1, q_2, \ldots, q_C$$

b. If C=0 in step "a", repeat step "a" after decrementing $J'_q$ by one each time within the range $\{j_{min}, j_i[0]-1\}$.
  c. If C=0 in step "b" with $J'_q=j_{min}$, decline service to the $i^{th}$ data server and inform higher layer.
  d. If $C \geq 1$ in steps 2, a or b, proceed to step 3.

3. Compute the cost of all combinations "q" within the subset Q found above as follows:

$$W_q = \sum_{k=1}^{K} a_{q,k} \cdot w_k;$$

$$q=q_1, q_2, \ldots, q_C$$

It is noted that, for a linear cost metric $w_k=k$, the above cost formula reduces to calculating the number of processors per combination $J'_q$ as defined in step 1.

4. Choose the combination, $\hat{q}$, where $$J'_{\hat{q}} = \sum_{k=1}^{K} a_{\hat{q},k} \cdot k$$

such that;

$$W_{\hat{q}} = \min_{c=1,\ldots,C} \{W_{q_c}\}$$

5. Map the set $\hat{q} \equiv \{a_{\hat{q},1}, \ldots, a_{\hat{q},k}\}$ to the set $\{\hat{a}_{i,1}[0], \ldots, \hat{a}_{i,k}[0]\}$, and assign $$j'_i[0] = \sum_{k=1}^{K} \hat{a}_{i,k}[0] \cdot k$$

processors to the $i^{th}$ data server for the initial service request.

6. Update the IN pool counters with the $i^{th}$ data server assignment $\{\hat{a}_{i,1}[0], \ldots, \hat{a}_{i,k}[0]\}$ as, $$L'_k[t^+]=L'_k[t^-]-\hat{a}_{i,k}[0]; \ k=1,\ldots,K.$$

B. The Sub-Service HA Handler Algorithm

1. The sub-service modification algorithm computes the number of processors $J'_q$ for any IN combination "q" as follows:

$$J'_q = \sum_{k=1}^{K} a_{q,k} \cdot k;$$

$$0 \leq a_{q,k} \leq L'_k$$

Where the $a_{q,k}$ are the numbers of the k-Processor IN's used for the combination "q".

2. Find the subset $Q=\{q_1, q_2, \ldots, q_C\}$, where C is the number of combinations within the subset, such that, $$J'_q \geq j_i[t+1]; \ q=q_1, q_2, \ldots, q_C$$

That is, the resulting number of processors 110 per any combination "q", $q=q_1, q_2, \ldots, q_C$, is greater than or equal to the required number of processors by the $i^{th}$ data server 105, $j_i[t+1]$, for the next sub-service.

a. If $j_i[t+1]<j'_i[t]$, the subset Q in step 2 will include at least the previous assignment $J'_i[t]$ (being held by default) plus other combinations of lower order (if available). Proceed to step 3.
  b. If $j_i[t+1]>j'_i[t]$ and $C \geq 1$ in step "2", this means upgrade is possible. Proceed to step 3.

c. If $j_i[t+1] > j'_i[t]$ and C=0 in step "2", this means upgrade is not possible. Decline the upgrade request to higher layer and reassign the set $\{â_{1,i}[t], \ldots, â_{i,k}[t]\}$ to the set $\{â_{i,l}[t+1], \ldots, â_{i,k}[t+1]\}$. Proceed to step 6.

3. Compute the cost of all combinations "q" within the subset Q found above as follows:

$$W_q = \sum_{k=1}^{K} a_{q,k} \cdot w_k;$$

$q = q_1, q_2, \ldots, q_C$

Similarly, for a linear cost metric $w_k = k$, the above cost formula reduces to calculating the number of processors per combination $J'_q$ as defined in step 1.

4. Choose the combination, $\hat{q}$, where $$J'_{\hat{q}} = \sum_{k=1}^{K} a_{\hat{q},k} \cdot k$$

such that;

$$W_{\hat{q}} = \min_{c=1,\ldots,C} \{W_{q_c}\}$$

5. Map the set $\hat{q} \equiv \{a_{\hat{q},1}, \ldots, a_{\hat{q},K}\}$ to the set $\{â_{i,l}[t+1], \ldots, â_{a,K}[t+1]\}$, and hence assign $$j'_i[t+1] = \sum_{k=1}^{K} â_{1,k}[t+1] \cdot k$$

processors to the $i^{th}$ data server 105 for the next sub-service.

6. Update the IN pool counters with the $i^{th}$ data server 105 assignment $\{â_{i,1}[t+1], \ldots, â_{i,k}[t+1]\}$, $L'_k[t+1] = L'_k[t] - â_{i,k}[t+1]; k=1, \ldots, K.$ i. If the sub-service HA handler algorithm assigns a new value $j'_i[t+1] \neq j'_i[t]$, then the new assignment is applied instead of the old one without interrupting the service (e.g., keep common processors between $j'_i[t+1]$ and $j'_i[t]$, or adopt a make-before-break mechanism). Otherwise $j'_i[t+1] = j'_i[t]$ and no action is needed beyond possible reconfiguration (step 434).

While this invention has been described in detail with particular reference to preferred embodiments thereof, it will be understood that variations and modifications can be effected within the scope of the invention as defined in the appended claims.

What is claimed is:

1. A system for coupling a plurality of processors in a base station to a plurality of data servers in the base station, comprising:
a plurality of sets of intermediate nodes in the base station, each intermediate node of the plurality of sets of intermediate nodes is adapted to couple a set of processors of the plurality of processors in the base station to a data server of the plurality of data servers in the base station, wherein the total number of intermediate node sets is greater than or equal to the number of processors in the set of processors and less than a maximum number of processors allowed per data server.

2. The system of claim 1, further comprising: a shared medium that is adapted to couple each of the data servers to a set of intermediate nodes.

3. The system of claim 1, wherein the number of processors is equal to the number of data servers.

4. The system of claim 1, further comprising: a system controller that is adapted to control coupling of the data servers to the processors.

5. The system of claim 4, wherein the system controller is further adapted to partition the plurality of processors into K sets associated with intermediate nodes according to the following equation:

$$N = \sum_{k=1}^{K} k * L_k$$

where $L_k$ is the number of intermediate nodes in the $k^{th}$ set.

6. The system of claim 4, wherein the system controller is further adapted to associate each set of intermediate nodes with a cost metric.

7. A method for coupling a plurality of processors in a base station to a plurality of data servers in the base station, comprising the steps of:
coupling a set of processors of the plurality of processors in the base station to a data server of the plurality of data servers in the base station through an intermediate node in a set of intermediate nodes of a plurality of sets of intermediate nodes in the base station,
wherein the total number of intermediate node sets is greater than or equal to the number of processors in the set of processors and less than a maximum number of processors allowed per data server.

8. The method of claim 7, further comprising the step of: coupling each of the data servers to a set of intermediate nodes through a shared medium.

9. The method of claim 7, wherein the number of processors is equal to the number of data servers.

10. The method of claim 7, further comprising the step of: controlling the coupling of the data servers to the processors using a system controller.

11. The method of claim 10, wherein the step of controlling the coupling of the data servers to the processors comprises the step of: partitioning the processors into K sets associated with intermediate nodes according to the following equation:

$$N = \sum_{k=1}^{K} k * L_k$$

where $L_k$ is the number of intermediate nodes in the $k^{th}$ set.

12. The method of claim 10, wherein the step of controlling the coupling of the data servers to the processors comprises the step of: associating each of the intermediate nodes with a cost metric.

13. A method for coupling a plurality of processors in a base station to a plurality of data servers in the base station through one or more sets of intermediate nodes in the base station, comprising the steps of:
determining whether there are any available data servers in response to a service request in the base station;
declining service if there are no available data servers;

assigning a data server in the base station to the service request if there is an available data server;
initiating a service context initiation routine for the service request;
verifying that the specified quality of service is satisfied; and
upon receiving a service release request associated with an active data server, unassociating the active data server from a set of intermediate nodes and a set of processors associated with the active data server.

14. The method of claim 13, wherein the step of initiating a service, context initiation routine comprises the steps of:
computing the number of processors, $J'_q$, for any intermediate node combination, q;
finding a subset $Q=\{q_1, q_2, \ldots, q_C\}$, where c is the number of combinations within the subset;
computing the cost of all combinations "q" within the subset Q;
choosing a combination, $\hat{q}$, where $$J'_{\hat{q}} = \sum_{k=1}^{K} a_{\hat{q},k} \cdot k$$

such that;

$$W_{\hat{q}} = \min_{c=1,\ldots,C} \{W_{q_c}\}$$

mapping the combination $\hat{q} \equiv \{a_{\hat{q},1}, \ldots, a_{\hat{q},K}\}$ to the set $\{\hat{a}_{i,1}[0], \ldots, \hat{a}_{i,K}[0]\}$; and
assigning processors to each data server according to the following equation:

$$j'_i[0] = \sum_{k=1}^{K} \hat{a}_{i,k}[0] \cdot k.$$

15. The method of claim 14, wherein the step of computing the number of processors, $J'_q$, for any intermediate node combination, q, is performed in accordance with the following equation:

$$J'_q = \sum_{k=1}^{K} a_{q,k} \cdot k;$$

$0 \leq a_{q,k} \leq L'_k$, where the $a_{q,k}$ are the numbers of the k-processor intermediate nodes used for the combination q.

16. The method of claim 14, wherein the step of finding a subset $Q=\{q_1, q_2, \ldots, q_C\}$, is perform in accordance with the following relationship:

$J'_q \geq j_i[0]; q=q_1, q_2, \ldots, q_C.$

17. The method of claim 14, wherein the step of finding a subset $Q=\{q_1, q_2, \ldots, q_C\}$, is perform in accordance with the following relationship:

$J'_q \geq j_i[t+1]; q=q_1, q_2, \ldots, q_C.$

18. The method of claim 14, wherein the step of computing the cost of all combinations "q" within the subset Q is performed in accordance with the following equation:

$$W_q = \sum_{k=1}^{K} a_{q,k} \cdot w_k;$$

$q=q_1, q_2, \ldots, q_C.$

19. The method of claim 14, further comprising the step of:
if C=0 in the step of finding a subset $Q=\{q_1, q_2, \ldots, q_C\}$ and $j_i[0] > j_{min}$, finding the subset $Q=\{q_1, q_2, \ldots, q_C\}$, such that, $J'_q = j_i[0]-1; q=q_1, q_2, \ldots, q_C.$ 20. The method of claim 19, further comprising the step of: decrementing $J'_q$.

21. The method of claim 14, further comprising the steps of:
receiving a sub-service modification request;
determining whether $j_i[t] \leq j_i[t+1] \leq j'_i[t]$;
if it is determined that $j_i[t] \leq j_i[t+1] \leq j'_i[t]$, setting $j'_i[t+1]=j'_i[t]$;
if it is not determined that $j_i[t] \leq j_i[t+1] \leq j'_i[t]$, updating intermediate node counters without releasing processors; initiating a sub-service HA handler algorithm.

22. A system controller for coupling a plurality of processors in a base station to one or more data servers in the base station, where the controller is adapted to:
determine whether there are any available data servers in response to a service request in the base station;
decline service if there are no available data servers;
assign a data server in the base station to the service request if there is an available data server;
initiate a service context initiation routine for the service request;
verify that the specified quality of service is satisfied; and
upon receiving a service release request associated with an active data server, unassociate the active data server from a set of intermediate nodes and a set of processors associated with the active data server.

23. The controller of claim 22, wherein the system controller is further adapted to:
compute the number of processors, $J'_q$, for any intermediate node combination, q;
find a subset $Q=\{q_1, q_2, \ldots, q_C\}$, where c is the number of combinations within the subset;
compute the cost of all combinations "q" within the subset Q;
choose a combination, $\hat{q}$, where $$J'_{\hat{q}} = \sum_{k=1}^{K} a_{\hat{q},k} \cdot k$$

such that;

$$W_{\hat{q}} = \min_{c=1,\ldots,C} \{W_{q_c}\}$$

map the combination $\hat{q} \equiv \{a_{\hat{q},1}, \ldots, a_{\hat{q},K}\}$ to the set $\{\hat{a}_{i,1}[0], \ldots, \hat{a}_{i,K}[0]\}$; and assign processors to the data server according to the following equation:

$$j'_1[0] = \sum_{k=1}^{K} \hat{a}_{i,k}[0] \cdot k.$$

24. The controller of claim 23, wherein the system controller is further adapted to compute the number of processors, $J'_q$, for any intermediate node combination, q, according to the following equation:

$$J'_q = \sum_{k=1}^{K} a_{q,k} \cdot k;$$

$0 \leq a_{q,k} \leq L'_k,$ where the $a_{q,k}$ are the numbers of the k-processor intermediate nodes used for the combination q.

* * * * *